United States Patent [19]

Stramel

[11] Patent Number: 5,759,256
[45] Date of Patent: Jun. 2, 1998

[54] METHOD FOR MAKING A RUTILE MIXED METAL OXIDE PIGMENT

[75] Inventor: Rodney D. Stramel, Edmond, Okla.

[73] Assignee: Kerr-McGee Chemical Corp., Oklahoma City, Okla.

[21] Appl. No.: 653,555

[22] Filed: May 24, 1996

[51] Int. Cl.⁶ ........................ C09C 1/36
[52] U.S. Cl. .............. 106/439; 106/440; 106/441; 106/447; 423/610
[58] Field of Search ............... 106/439, 440, 106/441, 447; 423/610

[56] References Cited

U.S. PATENT DOCUMENTS

| | | | |
|---|---|---|---|
| 2,084,826 | 6/1937 | Ryan et al. | 134/432 |
| 2,257,278 | 9/1941 | Schaumann | 106/440 |
| 3,022,186 | 2/1962 | Hund | 106/441 |
| 3,214,283 | 10/1965 | Chopoorian | 106/692 |
| 3,341,291 | 9/1972 | Mabbs et al. | 106/403 |
| 3,832,205 | 8/1974 | Lowery | 106/436 |
| 3,929,501 | 12/1975 | Dunn, Jr. | 106/439 |
| 4,036,662 | 7/1977 | Redemachers et al. | 106/430 |
| 4,448,608 | 5/1984 | Jenkins et al. | 106/428 |
| 4,902,485 | 2/1990 | Bayer et al. | 423/610 |
| 4,917,735 | 4/1990 | Rademachers et al. | 106/428 |
| 4,919,726 | 4/1990 | Rademachers et al. | 106/428 |
| 5,094,834 | 3/1992 | Wiederhoft et al. | 423/610 |
| 5,242,557 | 9/1993 | Jones et al. | 423/610 |

*Primary Examiner*—Mark L. Bell
*Assistant Examiner*—Louis M. Troilo
*Attorney, Agent, or Firm*—Herbert M. Hanegan; J. Rodgers Lunsford, III

[57] ABSTRACT

A rutile mixed metal oxide pigment can be prepared by calcining a rutile ore with a transition metal oxide. The rutile mixed oxide pigment can be dispersed in an emulsion to produce a paint or coating or the pigment can be combined with a network former and network modifier to produce a ceramic glaze.

25 Claims, 3 Drawing Sheets

METHOD FOR MAKING A RUTILE MIXED METAL OXIDE PIGMENT

BACKGROUND OF THE INVENTION

1. Field of the Invention

The invention relates to a method for producing a rutile mixed oxide pigment and more particularly to a method for producing a transition metal-containing rutile mixed oxide pigment.

2. Description of the Prior Art

Rutile mixed metal oxide pigments, also known as rutile mixed phase pigments, are pigments characterized by the rutile crystal structure and including at least two different metal oxides. Typically, titanium dioxide is the major constituent of many mixed oxide pigments. Generally, rutile mixed oxide pigments are colored, meaning that they exhibit a color other than white. An example of such a colored pigment is a nickel titanate rutile mixed oxide pigment that exhibits a yellow color. The nickel titanate rutile mixed oxide pigment is described in U.S. Pat. No. 2,257,278 to Schaumann, issued Sep. 30, 1941. Chromium rutile mixed oxide pigments are also commercially important.

Rutile mixed oxide pigment colors are obtained by incorporating a color-producing transition metal ion into the rutile crystal structure of a host oxide, such as titanium dioxide. Additionally, the rutile mixed oxide pigments can include metals, such as antimony or niobium, that exhibit high valence states to achieve electroneutrality.

Nickel or chromium titanate yellow pigments are manufactured using a calcination process whereby compounds containing nickel or chromium, and compounds containing antimony and titanium are intimately mixed together in either a wet or dry state in appropriate proportions to form the desired mixed metal oxide. The blend thus formed is then calcined at high temperature in a kiln or furnace. According to one such calcination technique for making nickel titanate yellow, an active grade of nickel carbonate is blended with a finely powdered active grade of antimony oxide and an active grade of titanium dioxide to produce a uniform mix. The mix is then calcined at 1000° C. until it is fully reacted to form the mixed oxide. Conventional processes all use synthetic titanium dioxide prepared using the chloride or sulfate process as titanium dioxide raw material. This synthetic titanium dioxide can be titanium oxide hydrate, titanium oxide hydroxide, titanyl sulfate, or synthetic anatase, ultrafine rutile or rutile pigments. All of the foregoing synthetic titanium dioxide starting materials are relatively expensive, value-added products.

Thus, there exists a need for a method for producing a mixed metal oxide pigment characterized by the rutile crystalline phase using as a starting material a relatively inexpensive rutile ore in place of a more expensive synthetic starting material.

SUMMARY OF THE INVENTION

The invention provides a method for producing a rutile mixed metal oxide by using a rutile ore starting material. According to the method, the rutile ore is combined with a transition metal oxide and calcined in a reactor to produce a rutile mixed metal oxide.

An object of this invention is to provide a method for producing a rutile mixed metal oxide using a rutile ore starting material.

Other and further objects, features, and advantages of the present invention will be readily apparent to those skilled in the art upon reading the description of preferred embodiments which follows.

DESCRIPTION OF PREFERRED EMBODIMENTS

As used herein in the specification and in the claims that follow, the term "mixed metal oxide" refers to an oxide including cations of one or more metallic elements. "Rutile ore" refers to a naturally occurring metal oxide having a rutile crystalline phase. Rutile mixed oxide pigments that can be prepared according to the method of the invention include pigments such as nickel antimony titanate, chromium antimony titanate, manganese antimony titanate, iron titanate, or cobalt titanate or mixtures thereof.

Figure 1:
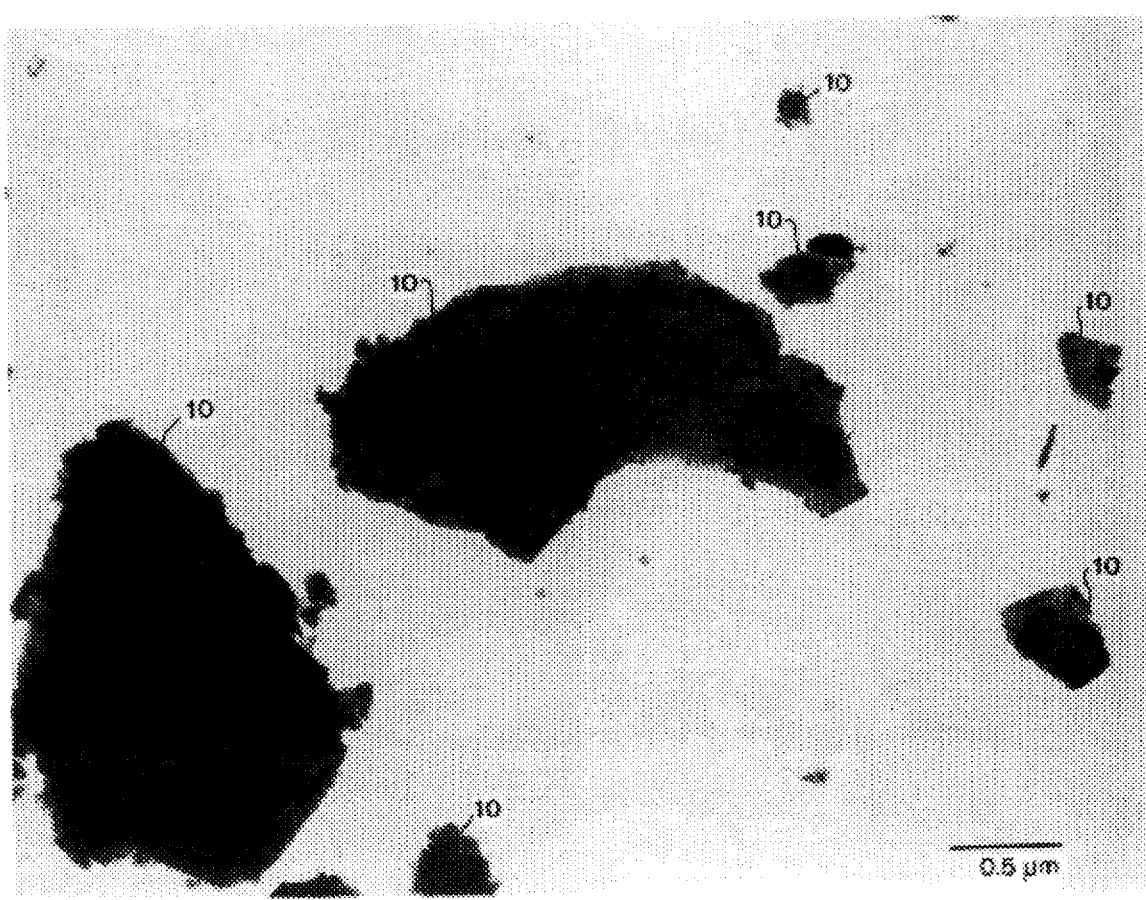
FIG. 1 is a transmission electron microphotograph of upgraded rutile ore particles

The rutile ore starting material can be an upgraded rutile ore having a titanium dioxide content in the range of from about 90% by weight to about 100% by weight, more preferably in the range of from about 95% by weight to about 100% by weight and most preferably in the range of from about 98% by weight to about 100% by weight. The term "upgraded rutile ore" refers to titanium dioxide containing ore that has been mechanically processed to remove impurities. The upgraded ore is a potential feed stock for conventional titanium dioxide production plants. The upgraded rutile ore is further characterized by a rutile ore particle size in the range of from about 0.01 μm to about 200 μm, more preferably in the range of from about 0.01 μm to about 50 μm, and most preferably in the range of from about 0.01 μm to about 10 μm. FIG. 1 is a transmission electron micrograph showing particles 10 of upgraded rutile ore. Particles 10 are irregularly shaped and range in size from about 0.01 μm to about 3 μm.

The step of combining the rutile ore with the transition metal oxide can further include steps of providing and intimately combining proper proportions of the rutile ore and the transition metal oxide to result in the rutile mixed metal oxide pigment. As used herein in the specification and claims, a "transition metal oxide" refers generally to an oxide compound containing a transition metal element, i.e., any one of the metals in the B groups in the fourth, fifth and sixth periods of the Periodic Table. The transition metal oxide can be nickel oxide, antimony oxide, chromium oxide, manganese oxide, iron oxide, or cobalt oxide, or mixtures thereof. Additionally, a chemical compound including a metal cation such as $W^{6+}$, $Mo^{6+}$, $Nb^{5+}$, or $Ta^{5+}$, or mixtures thereof can be combined with the rutile ore and the transition metal oxide.

The calcining step can be performed at a temperature in the range of from about 800° C. to about 1400° C., more preferably in the range of from about 800° C. to about 1300° C., and most preferably in the range of from about 900° C. to about 1100° C. until the rutile ore and transition metal oxide have reacted. An atmosphere such as oxygen, or nitrogen, or mixtures thereof can be provided during calcining. Calcining can be performed for a time in the range of from about 0.5 hr. to about 5.0 hrs., more preferably in the range of from about 1.0 hr. to about 4.0 hrs., and most preferably in the range of from about 1.0 hr. to about 3.0 hrs.

After the foregoing step of calcining, the rutile mixed metal oxide pigment can be removed from the reactor, cooled and ground to produce a ground powder, and calcined again. The ground powder can be characterized by a particle size in the range of from about 0.01 μm to about 50 μm, more preferably in the range of from about 0.1 μm to about 10 μm, and most preferably in the range of from about 0.2 μm to about 1.5 μm.

The rutile mixed oxide pigment produced according to the foregoing steps can be subjected to further processing steps to produce paints, coatings and plastics including the pigment.

A paint including the rutile mixed metal oxide pigment can be prepared by dispersing the rutile mixed metal oxide pigment in an emulsion. Typically, quantities of the rutile mixed metal oxide pigment in the range of from about 4% to about 16% by volume of the resulting emulsion can be used. The emulsion can be water-based and can contain latex particles, opacifiers, such as titanium dioxide, extenders, such as clay, biocides, dispersants, and mildewcides. The pigment can be dispersed in the emulsion using conventional techniques such as mechanical dispersion. Dispersants including ethoxylated compounds, such as ethoxylated alkylphenol, nonyl phenoxypoly(ethylene oxide), ethanol, ethylene oxide-oleic acid adduct, ethoxylated nonylphenol, carboxylates, fatty acid monoglycerides, sulfonates, sulfates, polyglycol ethers, amines, imidazoline, salts of acrylic acid, pyrophosphate and cetyl pyridinium chloride can also be part of the emulsion.

A coating is produced when the water in a water-based emulsion evaporates. Such a coating can include latexes such as poly(styrene-butadiene), polymethylmethacrylate, vinyl acetate monomer, ethyl acrylate monomer, butyl acrylate monomer and methyl acrylate monomer.

A plastic can be produced by combining the rutile mixed metal oxide pigment with a resin such as polyethylene, polypropylene or polystyrene.

A ceramic glaze can be formed by combining the rutile mixed metal oxide pigment with a network former, such as $Al_2O_3$, $SiO_2$, or $B_2O_3$, and a network modifier, such as alkali or alkaline earth metal oxides, like $Na_2O$, $K_2O$, MgO or CaO.

In order further to illustrate the present invention, the following examples are provided. The particular compounds, processes and conditions utilized in the examples are meant to be illustrative of the present invention and are not limited thereto.

Example 1

The following example is provided to show a method for production of a mixed metal oxide pigment using an upgraded rutile ore as a starting material.

Upgraded rutile ore is shown in FIG. 1. FIG. 1 is a transmission electron microphotograph showing upgraded rutile ore particles 10. The upgraded rutile ore (80.25 grams), antimony oxide (14.61 grams) and nickel oxide (3.74 grams) were blended together and calcined in a muffle furnace for one hour at 1000° C. The calcined sample was removed, cooled, and ground in a mortar with a pestle to obtain a ground pigment powder having a pigment particle size expected to be in the range of from about 1 micron to about 100 microns, while simultaneously accomplishing the result of mixing the pigment. The ground pigment powder was then calcined for an additional hour at 1000° C. After the second calcining, the sample was ground in a mortar with a pestle to yield a yellow-colored powder and additional processing and characterization steps were carried out as described in Example 2.

Example 2

The following example is provided to compare the optical properties of a mixed metal oxide nickel antimony titanate pigment prepared according to the foregoing Example 1 with those of two mixed metal oxide pigments prepared from synthetic rutile starting material and a commercially available nickel antimony titanate pigment.

Figure 2:
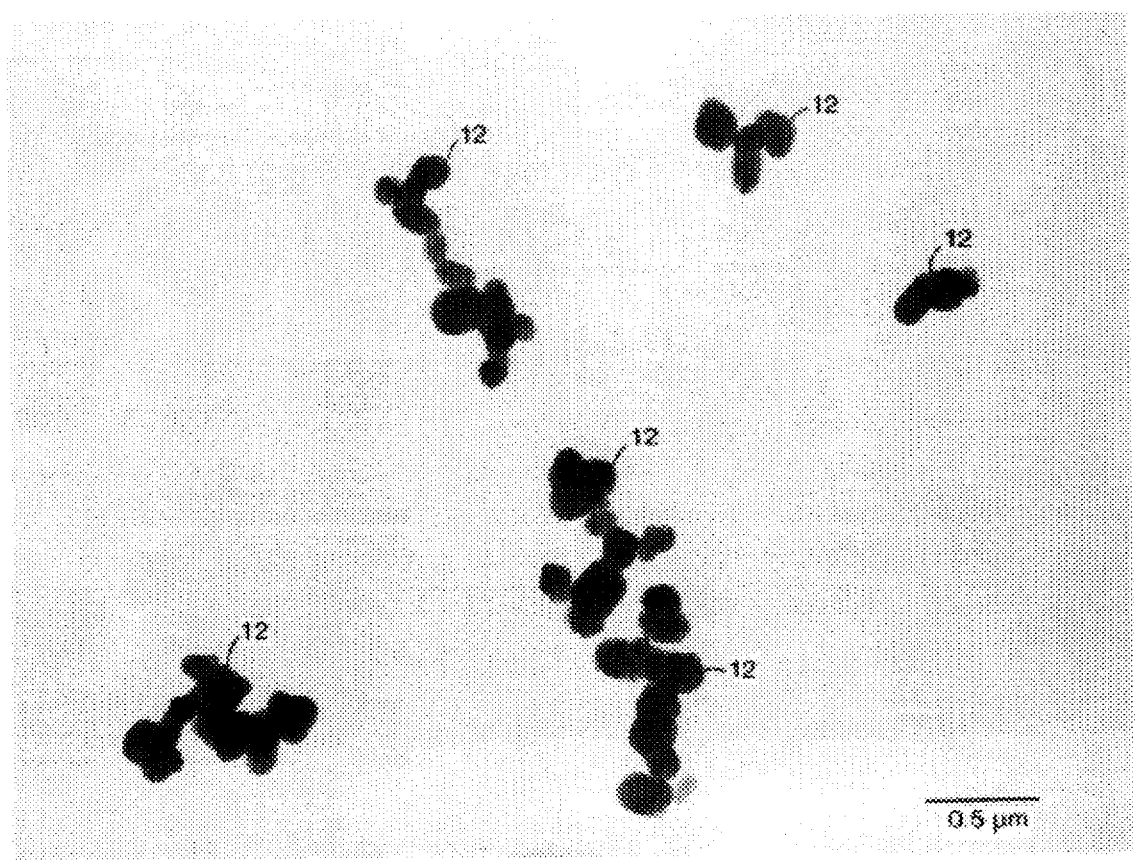
FIG. 2 is a transmission electron microphotograph showing synthetic rutile pigment (Tronox CR-837™) particles.

A sample of Tronox CR-837™ plastics grade rutile pigment is shown in FIG. 2. FIG. 2 is a transmission electron microphotograph showing spherical particles in agglomerates 12 and having a particle size in the range of from about 0.15 μm to about 0.30 μm. The Tronox CR-837™ plastics grade rutile pigment (80.25 grams) produced by Kerr-McGee Chemical Corporation, Oklahoma City, Ok., using the chloride process, antimony oxide (14.61 grams) and nickel oxide (3.74 grams) were blended together and calcined in a muffle furnace for one hour at 1000° C. The calcined sample was removed, cooled, and ground in a mortar with a pestle to obtain a ground pigment powder expected to have a pigment particle size in the range of from about 1 micron to about 100 microns while simultaneously accomplishing the result of mixing the pigment. The ground pigment powder was then calcined for an additional hour at 1000° C. After the second calcining, the sample was ground in a mortar with a pestle to yield a yellow-colored powder and additional processing and characterization steps were performed as will be described later in this example.

Figure 3:
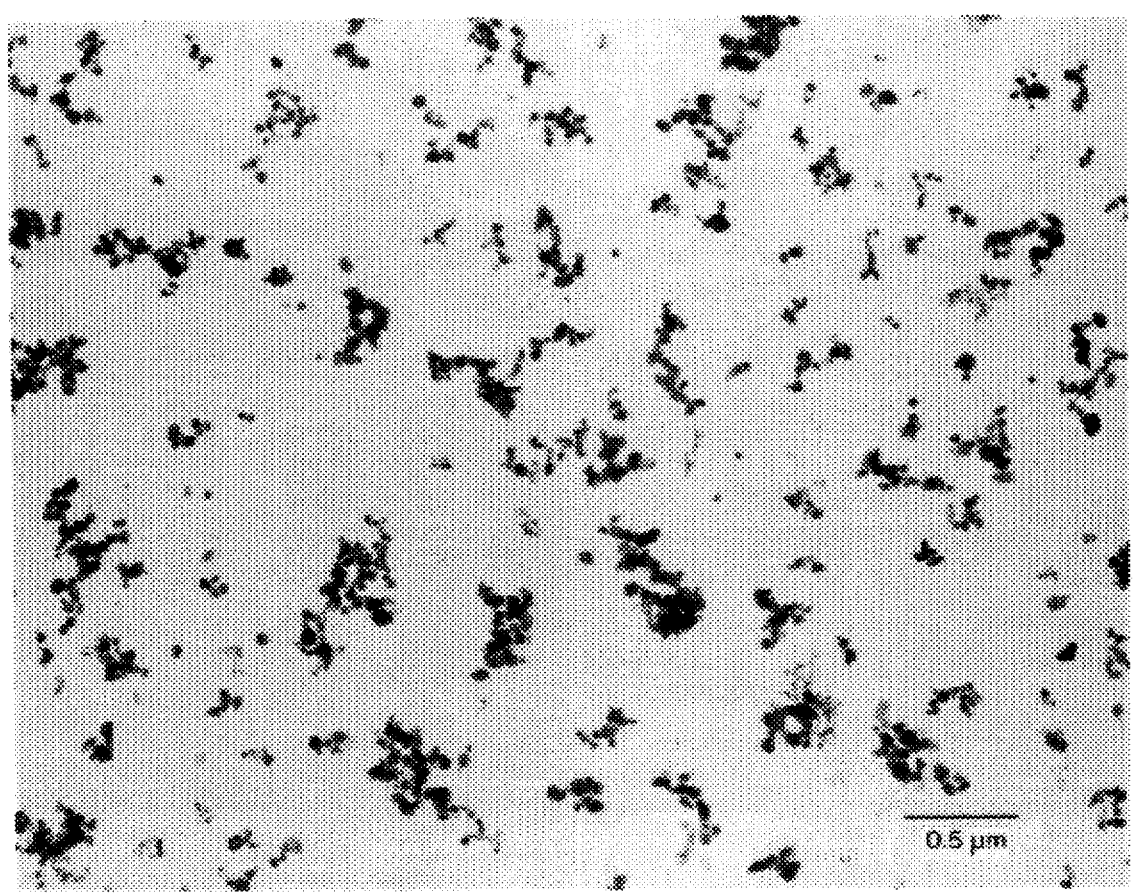
FIG. 3 is a transmission electron microphotograph showing synthetic ultrafine rutile pigment.

Ultrafine rutile, having a surface area of 40 m²/g, produced by Kerr-McGee Chemical Company, Oklahoma City, Ok. is shown in FIG. 3. FIG. 3 is a transmission electron microphotograph showing "chains" of joined spherical ultrafine rutile particles prepared by a combustion process. Particle sizes are in the range of from about 0.02 μm to about 0.05 μm. The ultrafine rutile (80.25 grams), antimony oxide (14.61 grams) and nickel oxide (3.74 grams) were blended together and calcined in a muffle furnace for one hour at 1000° C. The calcined sample was removed, cooled, and ground in a mortar with a pestle to obtain a pigment particle size in the range of from about 1 micron to about 100 microns, while simultaneously accomplishing the result of mixing the pigment. The ground pigment powder was then calcined for an additional hour at 1000° C. After the second calcining, the sample was ground in a mortar with a pestle to yield a yellow-colored powder and additional processing and characterization steps were performed as described later in this example.

A sample of Ciba Geigy Yellow 53 pigment, a nickel antimony titanate manufactured by Ciba Geigy was used in as-received condition in the optical properties studies described below.

Samples of the pigment produced according to Example 1, as well as samples of the three pigments described above were ground in a high shear disperser in a colorless alkyd paint. Coatings of the pigment-containing paint were drawn on black and white charts to give an optically thick coating, i.e., a coating having a reflectance over the white substrate equal to that over the black substrate. The tristimulus values, X, Y, Z, as are well known to one skilled in the art, were obtained using a Macbeth Color-eye 7000 spectrophotometer. The x and y trichromatic coefficients were calculated from this data as follows:

$$x = \frac{X}{X+Y+Z}$$

$$y = \frac{Y}{X+Y+Z}$$

where x and y are used to determine the "Dominant Wavelength" and "Luminous Reflectance", respectively, according to the 1964 CIE Supplementary Standard Observer. "Y" is equal to the "Spectral Purity". The results of this analysis as obtained for all four samples are summarized in Table 1 for comparison.

TABLE 1

| Sample | Dominant Wavelength (nm) | Spectral Purity (%) | Luminous Reflectance (%) |
|---|---|---|---|
| Upgraded Rutile Ore-Based (Example 1) | 575 | 56 | 57 |
| Tronox CR-837 ™-Based | 574 | 49 | 73 |
| Ultrafine Rutile-Based | 572 | 45 | 66 |
| Ciba Geigy Yellow 53 ™ (as received Ni Sb titanate pigment) | 573 | 59 | 74 |

It is clear from the optical properties of the four yellow pigments studied, as given in Table 1, that the pigment prepared from the upgraded rutile ore is not as bright as the other three samples, since it exhibits the lowest luminous reflectance (57%). However, the pigment prepared from the upgraded rutile ore is yellow, with a dominant wavelength of 575 nm that compares favorably with the dominant wavelength exhibited by the other pigments. Furthermore, the pigment prepared from the upgraded rutile ore has a spectral purity of 56% that compares well with the 59% spectral purity of the commercial Ciba Geigy Yellow 53™ pigment. Thus, it is evident that a yellow pigment characterized by commercially acceptable optical properties can be prepared from the relatively inexpensive upgraded rutile ore starting material.

What is claimed is:

1. A method for producing a rutile mixed metal oxide pigment comprising the steps of:
    (a) providing a naturally occurring, chemically unaltered rutile ore;
    (b) upgrading said ore by mechanical processing and separation of impurities;
    (c) mixing said upgraded rutile ore with a transition metal oxide selected from the group consisting of nickel oxide, antimony oxide, chromium oxide, manganese oxide, iron oxide, cobalt oxide, and mixtures thereof; and
    (d) calcining said upgraded rutile ore and said transition metal oxide in a reactor to produce said rutile mixed metal oxide pigment.

2. The method of claim 1 wherein said upgraded rutile ore has a titanium dioxide content of more than about 90% by weight.

3. The method of claim 2 wherein said upgraded rutile ore is further characterized by a particle size distribution in the range of from about 0.01 μm to about 200 μm.

4. The method of claim 1 wherein said step (c) of mixing said upgraded rutile ore with said transition metal oxide further includes the step of providing and intimately mixing the proper proportions of said upgraded rutile ore and said transition metal oxide to yield the proper proportion in said rutile mixed metal oxide pigment.

5. The method of claim 1 wherein said step (d) of calcining is performed at a temperature in the range of from about 800° C. to about 1400° C. until said upgraded rutile ore and said transition metal oxide have reacted.

6. The method of claim 5 wherein said step (d) of calcining is performed in an atmosphere selected from the group consisting of oxygen, nitrogen, and mixtures thereof.

7. The method of claim 5 wherein said step (d) of calcining is performed for atime in the range of from about 0.5 hr. to about 5.0 hrs.

8. The method of claim 1 further including steps (e) removing said rutile mixed metal oxide pigment produced in step (d) from said reactor; (f) cooling said rutile mixed metal oxide pigment; (g) grinding said rutile mixed metal oxide pigment to produce a ground powder; and (h) calcining said ground powder.

9. The method of claim 1 wherein said rutile mixed metal oxide pigment produced is selected from the group consisting of nickel antimony titanate, chromium antimony titanate, manganese antimony titanate, iron titanate, cobalt titanate and mixtures thereof.

10. The method of claim 8 wherein step (g) of grinding yields said rutile mixed metal oxide pigment characterized by a particle size in the range of from about 0.01 m to about 50 μm.

11. The method of claim 1 further including the step of dispersing said rutile mixed metal oxide pigment in an emulsion to produce a paint.

12. The method of claim 11 wherein said emulsion includes water and further includes the step of evaporating said water to form a coating.

13. The method of claim 1 further including combining said rutile mixed metal oxide pigment with a resin to form a pigment-containing resin.

14. The method of claim 13 wherein said resin is selected from the group consisting of polyethylene, polypropylene, and polystyrene.

15. The method of claim 1 further including the step of combining said rutile mixed metal oxide pigment with a network former and a network modifier to form a ceramic glaze.

16. The method of claim 2 wherein said upgraded rutile ore has a titanium dioxide content in the range of from about 95% to about 100% by weight.

17. The method of claim 16 wherein said upgraded rutile ore has a titanium dioxide content in the range of from about 98% to about 100% by weight.

18. The method of claim 3 wherein said particle size distribution is in the range of from about 0.01 μm to about 50 μm.

19. The method of claim 18 wherein said particle size distribution is in the range of from about 0.01 μm to about 10 μm.

20. The method of claim 5 wherein step (d) is performed at a temperature in the range of from about 800° C. to about 1300° C.

21. The method of claim 20 wherein step (d) is performed at a temperature in the range of from about 900° C. to about 1100° C.

22. The method of claim 7 wherein step (d) is performed for a time in the range of from about 1 hour to about 4 hours.

23. The method of claim 22 wherein step (d) is performed for a time in the range of from about 1 to about 3 hours.

24. The method of claim 10 wherein step (g) yields a particle size in the range of from about 0.1 μm to about 10 μm.

25. The method of claim 24 wherein step (g) yields a particle size in the range of from about 0.2 μm to about 1.5 μm.

* * * * *